Sept. 25, 1951  B. S. BLAISSE ET AL  2,568,943
X-RAY CAMERA AND SYSTEM
Filed Jan. 2, 1948
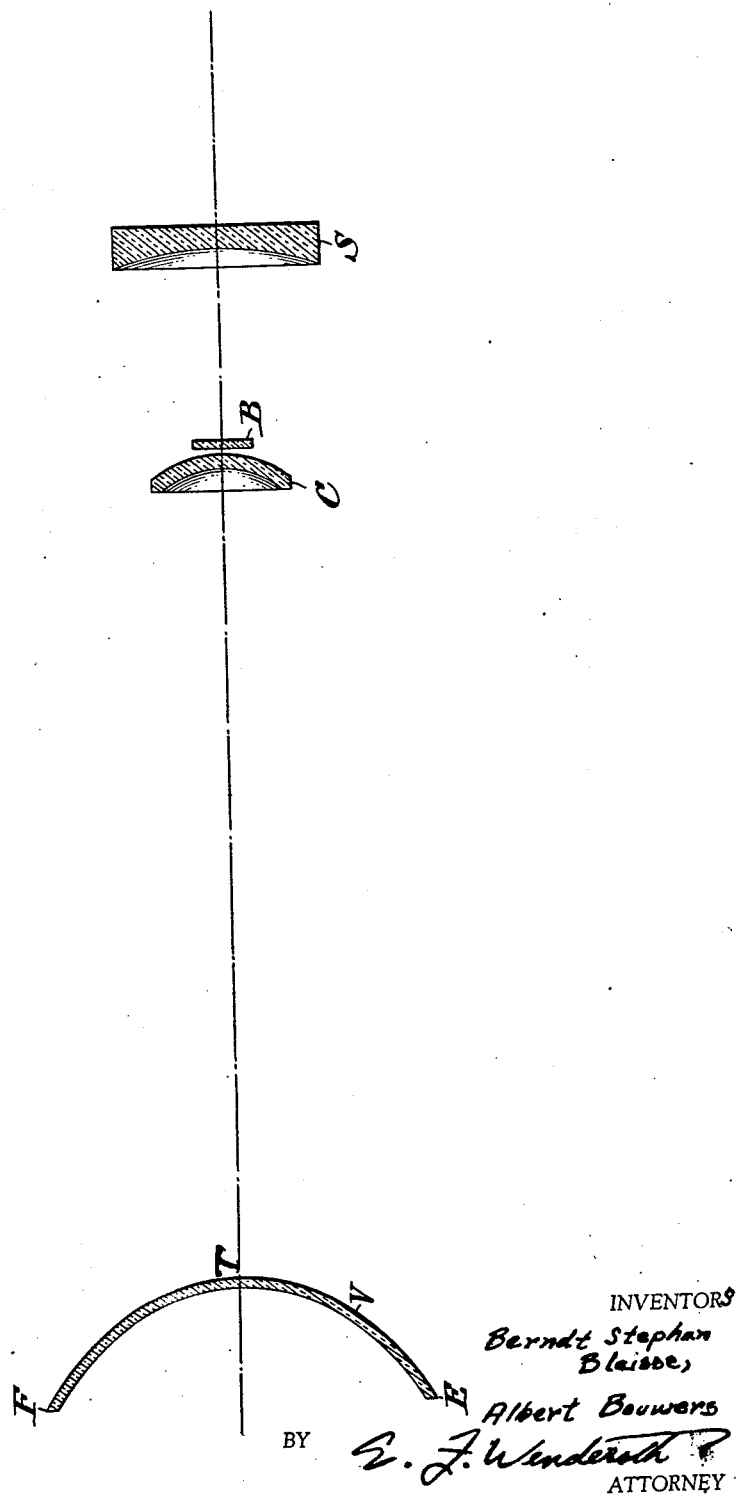
INVENTORS
Berndt Stephan
Blaisse,
Albert Bouwers
BY E. F. Wenderoth
ATTORNEY Patented Sept. 25, 1951

2,568,943

UNITED STATES PATENT OFFICE 2,568,943

X-RAY CAMERA AND SYSTEM

Berndt Stephan Blaisse and Albert Bouwers, Delft, Netherlands, assignors to N. V. Optische Industrie "de Oude Delft," Delft, Netherlands Application January 2, 1948, Serial No. 220
In the Netherlands January 6, 1947

8 Claims. (Cl. 250—64)

These last few years various types of X-ray cameras have been developed, which are intended to obtain reduced photographs of X-ray images received on a fluorescent screen. On account of the low brightness of a fluorescent image it is required to utilise an optical system of very high luminosity. An important group of the objective lenses developed for this purpose is formed by optical systems constituted by a mirror and one or a plurality of correcting elements in the form of an aspherical plate (Schmidt system) and/or one or a plurality of meniscus lenses (Bouwers system), the complete camera being constituted by a plane fluorescent screen, the objective, the image support and accessories such as the shutter.

A disadvantage of the use of such systems resides, however, in the curvature of the image field, since the plane film is required to be curved so as to engage a substantially spherical image support and this leads to folds in the film if the elasticity thereof is inadequate.

According to the invention, the tendency to folding is reduced by attenuating the curvature of the image support in one direction (for example the horizontal) so that the surface thereof becomes substantially a portion of an ellipsoid of revolution having its axis of revolution at right angles to the optical axis. The extent of the reduction in curvature required, with a given elasticity of the film, to prevent folds which might affects the definition of the image to any appreciable extent may be ascertained in each individual case. According to the invention the shape of the object surface is to be matched to that of the image support. Thus an approximately cylindrical object surface is obtained, corresponding to the approximately ellipsoidal image surface. When in taking X-ray photographs it is provided for the fluorescent screen to exhibit such a cylindrical shape (and this in such manner that the generatrices extend vertically) its shape may furthermore be matched to the body of a patient and this still adds to the marginal definition of the image.

The tendency towards folding of the film may, however, also be suppressed completely. To this purpose the image support is given a purely cylindrical shape (with, for example, horizontal generatrices). The object surface corresponding thereto is, as before, substantially cylindrical in shape having vertical generatrices.

The invention will now be explained more fully by reference to the accompanying drawing, showing, by way of example, one embodiment thereof.

The sole figure shows a horizontal section of an X-ray camera, the objective of which is constituted by a mirror and a spherical corrector. The figure only shows the essential parts, viz. a fluorescent screen V, a concave mirror S (radius 302 mm.), a corrector C which is concentric therewith, and a cylindrical image support B (60 x 60 mm.$^2$), having horizontal generatrices. The image support is purely cylindrical and the section at right angles to the generatrices is a circle having a radius of 140 mm.

The screen V, which is sharply projected on to the film, slightly differs from the purely cylindrical shape, vertical sections having no straight lines. The divergence is, however, only small. As may be seen from the figure, the horizontal section is not purely circular. The radius of curvature of the circle through the apex T and the extremities E and F is 22.5 cm., which value is extremely suitable for taking radiographs of the breast. It is evident that in the case of X-ray installations intended for radiographing prostrate patients, the generatrices of the cylindrical fluorescent screen are required to extend horizontally.

What we claim is:

1. An X-ray camera and the like having an optical system which forms a curved image of a flat object comprising a concave mirror, a corrector element spaced from said mirror and concentric therewith, a substantially cylindrically shaped fluorescent screen with vertical generatrices spaced from said corrector element and having convex curvature toward the objective and a purely cylindrical image support interposed between said mirror and said corrector element, said image support having horizontal generatrices, the generatrices of said screen and said image support being at right angles to each other and to the optical axis of said system, the object and image surfaces being optically conjugate and both being aspherically curved.

2. An X-ray camera and the like as claimed in claim 1, said image support in a section at right angles to said generatrices being a circle having a radius of 140 mm.

3. An X-ray camera and the like as claimed in claim 2, said screen diverging slightly from a purely cylindrical shape in horizontal section, the form of the object and image supports being optically conjugate and both being aspherically curved and adaptable for providing sharp pictures.

4. An X-ray camera and the like having an optical system which forms a curved image of a flat object comprising a concave mirror, a corrector element spaced from said mirror and concentric therewith, a substantially cylindrically shaped fluorescent screen spaced from said corrector element and having convex curvature toward the objective and a substantially cylindrical image support interposed between said mirror and said corrector element, said image support having horizontal generatrices, the generatrices of said screen and said image support being at right angles to each other and to the optical axis of said system, the object and image surfaces being optically conjugate and both being aspherically curved.

5. An X-ray camera and the like having an optical system, a fluorescent screen and an image support, said optical system comprising a concave mirror and a corrector element which corrects the spherical aberration of said mirror, said optical system being uncorrected for image curvature which amounts to about $1/f$, $f$ being the equivalent focal length of said optical system, said image support being convex towards said concave mirror and having in one direction a curvature of about $1/f$ and in the direction perpendicular thereto a curvature which is smaller than $1/f$ said fluorescent screen having a surface which is convex towards said concave mirror and being optically conjugate to the surface of the image support, both object and image surfaces being aspherically curved.

6. An X-ray camera and the like having an optical system, a fluorescent screen and an image support, said optical system comprising a concave mirror and a corrector element which corrects the spherical aberration of said mirror, said optical system being uncorrected for image curvature which amounts to about $1/f$, $f$ being the equivalent focal length of said optical system, said image support being cylindrical and convex towards said concave mirror and having a radius of curvature of about $f$, said fluorescent screen being convex towards said concave mirror and being substantially cylindrical and having generatrices which are perpendicular to the generatrices of said image support, the object and image surfaces being optically conjugate and both being aspherically curved.

7. A projecting system and the like, having an optical system, an object support and a projection screen, said optical system comprising a concave mirror and a corrector element which corrects the spherical aberration of said mirror, said optical system being uncorrected for image curvature which amounts to about $1/f$, $f$ being the equivalent focal length of said optical system, said object support being convex towards said concave mirror and having in one direction a curvature of about $1/f$ and in the direction perpendicular thereto a curvature which is smaller than $1/f$, said projection screen having a surface which is convex towards said concave mirror and being optically conjugate to the surface of the object support.

8. A projecting system and the like, having an optical system, an object support and a projection screen, said optical system comprising a concave mirror and a corrector element which corrects the spherical aberration of said mirror, said optical system being uncorrected for image curvature which amounts to about $1/f$, $f$ being the equivalent focal length of said optical system, said object support being cylindrical and convex towards said concave mirror and having a radius of curvature of about $f$, said projection screen, which is convex towards said concave mirror, being substantially cylindrical and having generatrices which are perpendicular to the generatrices of said object support.

BERNDT STEPHAN BLAISSE.
ALBERT BOUWERS.

REFERENCES CITED

The following references are of record in the file of this patent:

UNITED STATES PATENTS

| Number | Name | Date |
|---|---|---|
| 2,141,884 | Sonnefeld | Dec. 27, 1939 |
| 2,229,302 | Martin et al. | Jan. 21, 1941 |
| 2,248,976 | Files | July 15, 1941 |
| 2,265,992 | Beck | Dec. 16, 1941 |
| 2,296,943 | Okolicsanyi | Sept. 29, 1942 |
| 2,350,112 | Houghton | May 30, 1944 |
| 2,409,971 | Bennett | Oct. 22, 1946 |
| 2,420,349 | Bouwers | May 13, 1947 |

FOREIGN PATENTS

| Number | Country | Date |
|---|---|---|
| 82,671 | Germany | Aug. 7, 1895 |
| 544,694 | Great Britain | Apr. 23, 1942 |
| 885,425 | France | May 24, 1943 |